US00RE44801E

(19) United States
(12) Reissued Patent
Yoshimi

(10) Patent Number: US RE44,801 E
(45) Date of Reissued Patent: Mar. 11, 2014

(54) GAMING MACHINE WITH MULTIPLE REEL MATRIX

(71) Applicant: Konami Australia Pty, Ltd., Botany (AU)

(72) Inventor: Osamu Yoshimi, Botany (AU)

(73) Assignee: Konami Australia Pty, Ltd., Botany (AU)

(21) Appl. No.: 13/715,894

(22) Filed: Dec. 14, 2012

Related U.S. Patent Documents

Reissue of:
(64) Patent No.: 7,850,520
Issued: Dec. 14, 2010
Appl. No.: 11/413,707
Filed: Apr. 28, 2006

(30) Foreign Application Priority Data

Apr. 26, 2005 (AU) ..... 2005902074

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ..... 463/20; 463/16; 463/18; 463/19; 463/31; 273/143 R

(58) Field of Classification Search
None
See application file for complete search history.

(56) References Cited

U.S. PATENT DOCUMENTS 4,448,419 A 5/1984 Telnaes
5,152,529 A 10/1992 Okada
5,395,111 A 3/1995 Inoue
5,580,055 A 12/1996 Hagiwara
5,609,524 A 3/1997 Inoue
5,611,535 A 3/1997 Tiberio
5,624,119 A 4/1997 Leake
5,722,891 A * 3/1998 Inoue ..... 463/20
5,752,881 A 5/1998 Inoue
5,807,172 A 9/1998 Piechowiak
5,976,016 A 11/1999 Moody et al.
5,984,781 A 11/1999 Sunaga
6,007,066 A 12/1999 Moody
6,056,642 A * 5/2000 Bennett ..... 463/20
6,309,299 B1 10/2001 Weiss (Continued)

FOREIGN PATENT DOCUMENTS

AU 768153 1/2002
JP 06-246043 9/1994

OTHER PUBLICATIONS

JP 246043 (1994) Ugawa.*

*Primary Examiner* — Paul A D'Agostino
(74) *Attorney, Agent, or Firm* — Knobbe, Martens, Olson & Bear, LLP

(57) ABSTRACT

A bonus feature for a gaming machine in which additional graphic features are caused to be displayed as overlays of the graphic imagery of a base game; said graphic imagery of said base game comprising symbols arranged in a first matrix of symbol containing elements, wherein columns of said first matrix are visible portions of a rotatable set of inner reels; said additional graphic features comprising symbols in selected elements of a second matrix of elements, wherein columns of said second matrix of elements are visible portions of a rotatable set of outer reels; and wherein predetermined arrangements of said additional graphic features trigger at least one bonus feature game.

16 Claims, 7 Drawing Sheets

(56) References Cited

U.S. PATENT DOCUMENTS

| | | | | |
|---|---|---|---|---|
| 6,663,487 | B1 | 12/2003 | Ladner | |
| 6,726,204 | B2 | 4/2004 | Inoue | |
| 6,880,826 | B2 | 4/2005 | Inoue | |
| 6,893,018 | B2 | 5/2005 | Inoue | |
| 6,905,408 | B2 | 6/2005 | Inoue | |
| 7,214,132 | B2 | 5/2007 | Inoue | |
| 7,311,602 | B2 | 12/2007 | Inoue | |
| 2004/0012145 | A1 | 1/2004 | Inoue | |
| 2004/0014516 | A1 | 1/2004 | Inoue | |
| 2004/0017041 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0063488 | A1* | 4/2004 | Berman | 463/18 |
| 2005/0043083 | A1 | 2/2005 | Inoue | |
| 2005/0043084 | A1 | 2/2005 | Inoue | |
| 2005/0277460 | A1 | 12/2005 | Inoue | |
| 2006/0046830 | A1 | 3/2006 | Webb | |
| 2006/0052155 | A1 | 3/2006 | Inoue | |
| 2006/0084492 | A1 | 4/2006 | Baerlocher et al. | |
| 2006/0084498 | A1 | 4/2006 | Baerlocher et al. | |
| 2006/0166731 | A1 | 7/2006 | Yoshimi et al. | |

* cited by examiner

GAMING MACHINE WITH MULTIPLE REEL MATRIX

Matter enclosed in heavy brackets [ ] appears in the original patent but forms no part of this reissue specification; matter printed in italics indicates the additions made by reissue.

This application *is a reissue of U.S. Pat. No. 7,850,520, which* claims priority to Australian Provisional Application No. 2005902074 filed Apr. 26, 2005 which is hereby incorporated herein by reference in its entirety.

The present invention relates to gaming machines offering bonus games and, more particularly to a gaming machine in which the conferring of a bonus game on a player is independent of an outcome of a main game played on the machine.

BACKGROUND

Gaming, or poker machines, have become a major source of amusement and diversion in such places as clubs, hotels and casinos in many parts of the world.

Traditionally such machines were mechanical devices where a number of reels marked with a plurality of numbers or symbols could be made to spin randomly by the application of some mechanical input. If the subsequent patterns of numbers or symbols displayed on the reels, when these returned to a rest state, corresponded to predetermined patterns, the machine would provide a prize or payout. Generally such gaming machines have come to be regulated by government authorities as to their number and in the manner in which the machines must return a percentage of the monetary turnover to the players.

The introduction of electronics, computers and electronic graphical displays, has allowed a continual increase in the complexity and variations of gaming machines, games and displays while maintaining the basic concept of the traditional machine.

Machines and games that offer novel and stimulating variations on the basic game theme and environment are eagerly sought by the gaming industry and there is consequently intense competition between machine manufacturers to innovate.

Nevertheless the repetitive playing of even modern gaming machines can lead to boredom of the players with a consequent under-utilization of machines and increase in player dissatisfaction.

It is an object of the present invention to address or at least ameliorate some of the above disadvantages.

BRIEF DESCRIPTION OF INVENTION

Accordingly, in a first broad form of the invention there is provided, a bonus feature for a gaming machine in which additional graphic features are caused to be displayed as overlays of the graphic imagery of a base game; said graphic imagery of said base game comprising symbols arranged in a first matrix of symbol containing elements, wherein columns of said first matrix are visible portions of a rotatable set of inner reels; said additional graphic features comprising symbols in selected elements of a second matrix of elements, wherein columns of said second matrix of elements are visible portions of a rotatable set of outer reels; and wherein predetermined arrangements of said additional graphic features trigger at least one bonus feature game.

Preferably, displayed respective elements of said inner reels and elements of said outer reels, remain in registration while said inner reels and said outer reels are rotating and when said inner reels and said outer reels are at rest.

Preferably, said symbols of said bonus feature are positioned in said elements of said second matrix so as not to obscure said symbols in said elements of said first matrix.

Preferably, said bonus feature and said base game are logically distinct; neither one influencing an outcome of the other.

Preferably, sequences of said additional graphic features on each reel of said set of outer reels are predetermined.

Preferably, said set of outer reels is one of a plurality of sets of predetermined outer reels.

Preferably, random selection determines which set of said plurality of sets of pre-determined outer reels is used for said bonus feature for each play of said base game.

Preferably, each set of said plurality of sets of predetermined outer reels confers a different probability of triggering said at least one bonus game.

Preferably, value of a bet on said base game determines a weighting applied to said random selection of said set of said outer reels.

Preferably, selection of a line bet on said base game determines a weighting applied to said random selection of said set of said outer reels.

Preferably, selection of a combination of value of a bet and selection of a pay line determines a weighting applied to said random selection of said set of said outer reels.

Preferably, probability of triggering said at least one bonus game is greater than zero for any selection of said set of outer reels.

Preferably, a bonus feature game conferred by a predetermined displayed outcome of said bonus feature is played on a primary display screen of said gaming machine.

Preferably, a bonus feature game conferred by a predetermined displayed outcome of said outer reels is played on a secondary display screen of said gaming machine.

Preferably, said bonus feature game is played on a primary display of said gaming machine; a secondary display of said machine displaying a progressive jackpot feature associated with said bonus feature game.

Preferably, said base game and said bonus feature game are played on a number of gaming machines linked to a progressive jackpot controller.

Preferably, elements of said base game are bounded by n-sided figures where n is an integer with values between 1 and 20.

Preferably, said n-sided figures of adjoining said inner reels of said base game are aligned in rows.

Preferably, said n-sided figures of adjoining said inner reels of said base game are staggered to allow nesting of contiguous n-sided elements.

Preferably, symbols of said bonus feature are arranged for display when said inner and said outer reels are at rest, adjoining to but outside of said n-sided figure of said base game.

Preferably, symbols of said bonus feature game are arranged for displayed when said inner and said outer reels are at rest, within said n-sided figures.

In a further broad form of the invention there is provided a method of implementing a game as described above on a gaming machine; said gaming machine including at least one electronic display module and an input keyboard; said method including the steps of:

(a) providing said gaming machine with a control module; said module including a microprocessor, a working memory and a data storage devices, (b) writing program code to said data storage devices, (c) connecting said data storage devices to said control module.

In yet a further broad form of the invention there is provided media for storing enabling digital code for playing games as described above; said media comprising solid state data retaining devices including, read only memory (ROM) and erasable programmable read only memory (EPROM), compact flash cards and PCMCIA cards; said media further including disc-based storage devices.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Figure 1:
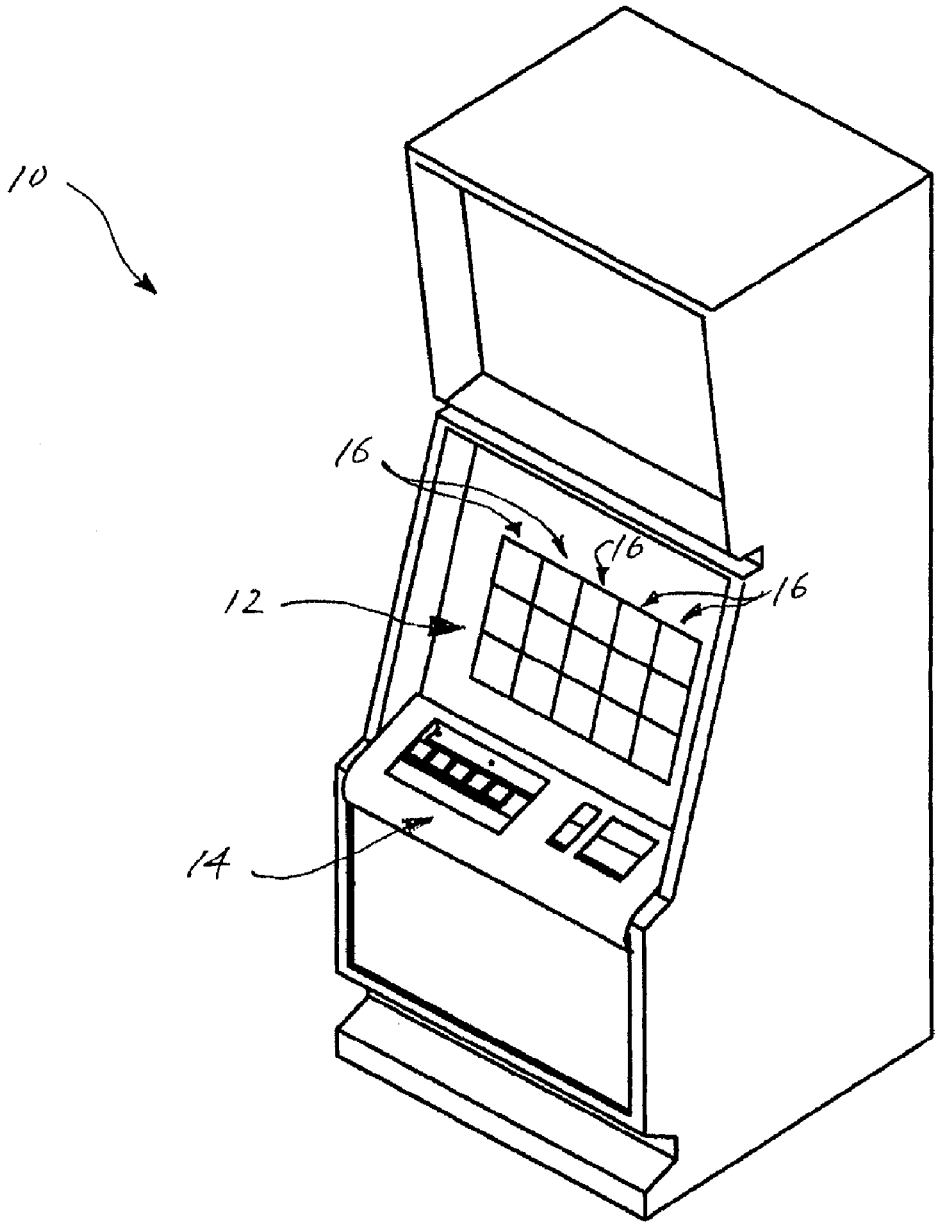
FIG. 1 is a perspective view of a typical stand-alone gaming machine for play of a multiple reel matrix game according to a preferred embodiment of the invention.

With reference to FIG. 1, a typical gaming machine 10 is provided with an electronic display module 12 and control panel 14 provided with control buttons and coin and/or bill input means. Players of a game on the machine may place bets according to rules displayed on the machine. Typically a base game played on the machine consists of the simulated randomised spinning of a number of coaxial reels, each divided into segments or elements wherein each element is adapted to display a predetermined symbol.

The display 12 then shows portions of the reels such that when the reels are at rest, the display consists of a matrix of elements in which the columns 16 comprise a number of the elements of each reel, in this example forming a five column by three row matrix. A predetermined arrangement of symbols displayed in the matrix may confer a winning outcome of the game.

Figure 2:
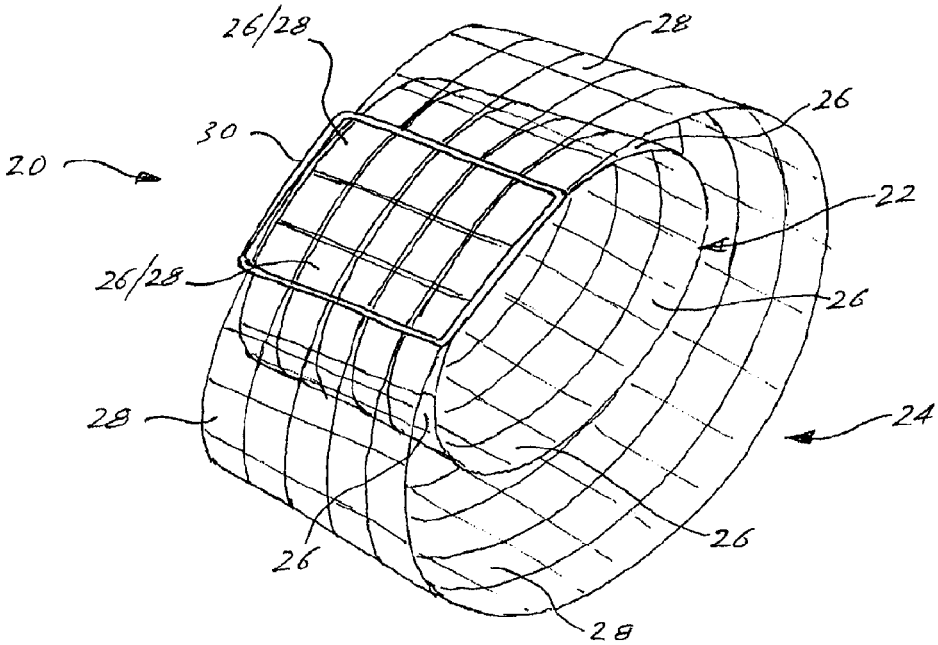
FIG. 2 is a representation of simulated sets of base game inner reels and bonus feature outer reels.

With reference now to FIG. 2, an electronic gaming machine of the present invention is adapted to generate a display 20 of two sets of simulated coaxial reels, a first set of inner reels 22 and a second outer set of reels 24. The inner reel elements 26 carry symbols (not shown) determinant of a base game while the elements 28 of the outer reels carry symbols (not shown) defining a bonus feature.

As can be seen in FIG. 2, the two sets have an equal number of reels, five in this example, and their disposition is such that, within the confines of the display module 30, they are in close apparent proximity and the corresponding elements 26 and 28 are in registration. That is, an equal number of elements of each corresponding inner and outer reel form overlying columns of a first and second matrix of elements.

Although for illustrative purposes FIG. 2 shows the dividing lines between the outer reels 24 and their divisions into elements 28, it will be understood that these may be notional divisions and that the function of the outer reels may be achieved without these divisions actually appearing in the display. Thus the outer reels 24 may be considered as comprising of transparent film on which are placed, in selected notional elements, the symbols of the bonus feature.

Figure 3:
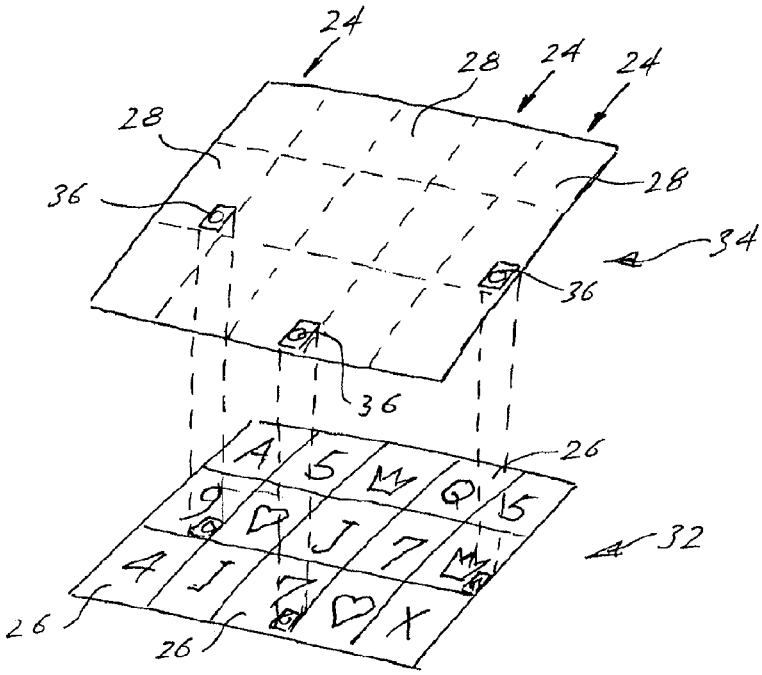
FIG. 3 is a perspective view of matrices of elements in displayed portions of the set of inner reels and outer reels of FIG. 2, separated for clarity.

FIG. 3 shows the first matrix 32 formed in the display by the inner reels 22 and the second matrix 34 formed by the outer reels 24, separated here for clarity. The notional divisions between the outer reels 24 and their elements 28 are shown by dashed lines. As shown in FIG. 3, only some of the notional elements of the outer reels are provided with symbols 36 for the bonus feature. These are so located within the notional elements, for example in a corner of the element, that when the outer matrix overlies the inner, the symbols of the bonus feature do not obscure the symbols of the base game.

At the initiation of play of a base game on the machine, both sets of reels are simulated to spin simultaneously such that the angular velocity of the inner and outer set are equal. Thus, even though the outer reels may comprise significantly more elements than the inner reels, during passage through the display area, symbols on the bonus feature reels will appear to remain in relative registration with the elements and symbols of the base game reels.

It will be apparent that during play of a base game with the bonus feature, for each subsequent passage through the display by the elements of the inner and outer reels, the conjunction between a given inner reel element and a symbol of the bonus feature will not remain the same if the outer reels have more elements than the inner reels.

When both sets of reels have been brought to rest, the awarding of one or more bonus feature games depends on a predetermined conjunction between the symbols now displayed for the base game and the pattern of overlying symbols of the bonus feature reels.

It should be noted that the randomized rotation, selection of winning elements to appear on a pay line and any other parameters of the base game, are generated by code drawn from a data storage device independent from that of the bonus feature and any bonus feature game. The only correlation therefore between these two aspects is the synchronization of the angular velocity and registration of elements of the two matrices within the display boundary. Indeed the bonus feature need not be initiated for every play of the base game, but may be offered as an optional feature.

The set of inner reels and the symbols thereon are constant for any base game played on the machine. However, the set of outer reels is selected from a plurality of sets of outer reels, which may be simulated for a given play of the base game. Each set of the plurality of sets comprises a different configuration of bonus feature symbols and each set is associated with a different probability of conferring one or more bonus feature games. The probability of triggering one or more bonus feature games is greater than zero for all of the available plurality of sets.

The selection of a particular set of outer reels for any play of the base game is basically random, but may be weighted in a number of ways depending on choices of play made by the player of a base game. Thus for example, the weighting may be a function of the bet placed by a player or of the choice of pay line, or a combination of these.

The results of both the base game and the bonus feature are displayed together at the conclusion of a spin of the game. The base game will trigger on any symbols according to the game's pay table and any prize, bonus or free spins awarded. Following this, the result of the bonus feature is independently assessed through its pay table to determine if one or more bonus feature games should be awarded.

Second Preferred Embodiment

In a second preferred embodiment of the invention, a base game is again played on a set of internal reels, with a bonus feature implemented by a set of external reels as described for the First Preferred Embodiment above. In this form of the invention however, the symbol containing elements of the inner set of reels are not necessarily defined by four sides or as simple division of the reels into a plurality of segments as depicted in FIG. 1, but may be made up of n-sided elements where n is an integer including the values 1, 3, 4 and 5 through 20.

Figure 7:
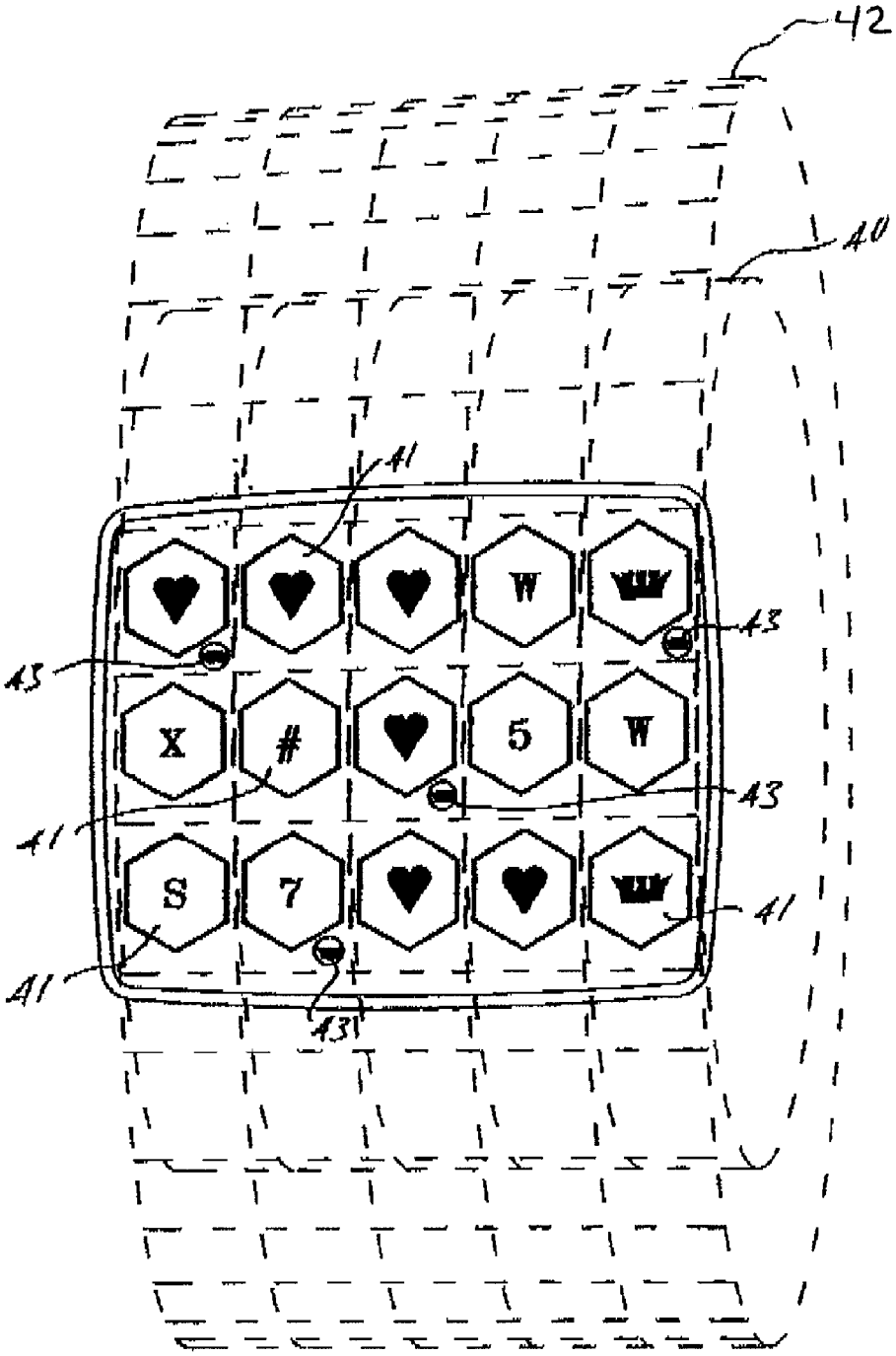
FIGS. 7 and 8 are representations of a second simulated set of base game inner reels and bonus feature outer reels.

As for example, shown in FIG. 7, inner reels 40 now comprise a plurality of elements 41 delineated by hexagonal boundaries where n=6. When both inner reels 40 and outer bonus feature reels 42 are at rest, symbols 43 carried on the bonus feature reels 42 appear adjacent the hexagonal boundary of a number of inner reel elements 41. As also shown by dashed lines in FIG. 5, the divisions between adjoining reels and adjoining elements may be notional, and not actually displayed.

Figure 8:
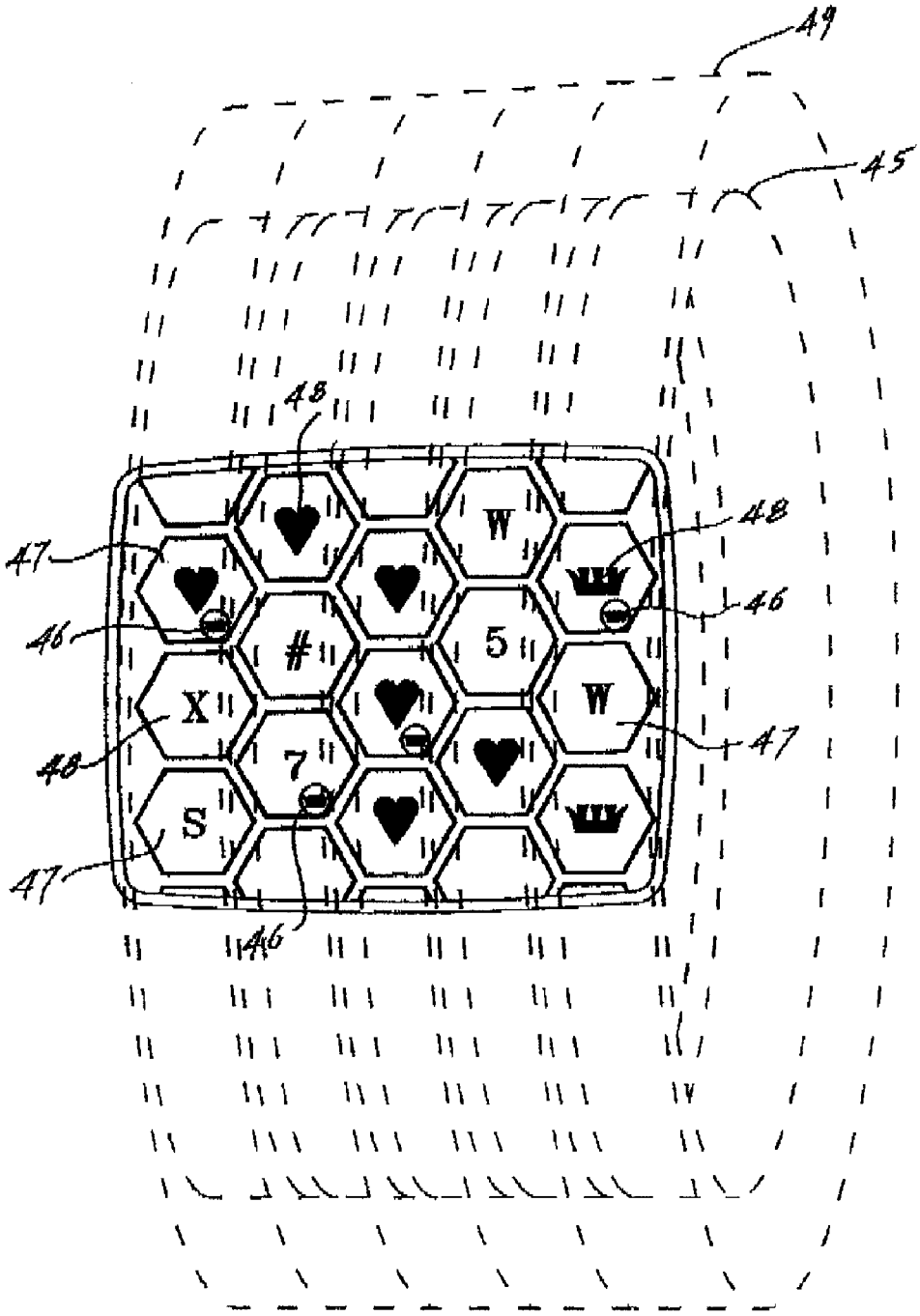

The n-sided elements 41 of each adjoining inner reel 40 in FIG. 7 are in vertical alignment, but in at least one preferred form for the special case of n=6, the hexagon elements may be nested when the reels come to rest as shown in FIG. 8. The notional inner reels 45 then overlap and during rotation, side portions of the hexagonal elements of adjoining reels will appear to overlap also. When at rest the notional divisions of adjoining reels, both inner reels 45 and outer bonus feature reels 49 are staggered so as to form the nested disposition of the hexagonal elements.

Figure 6:
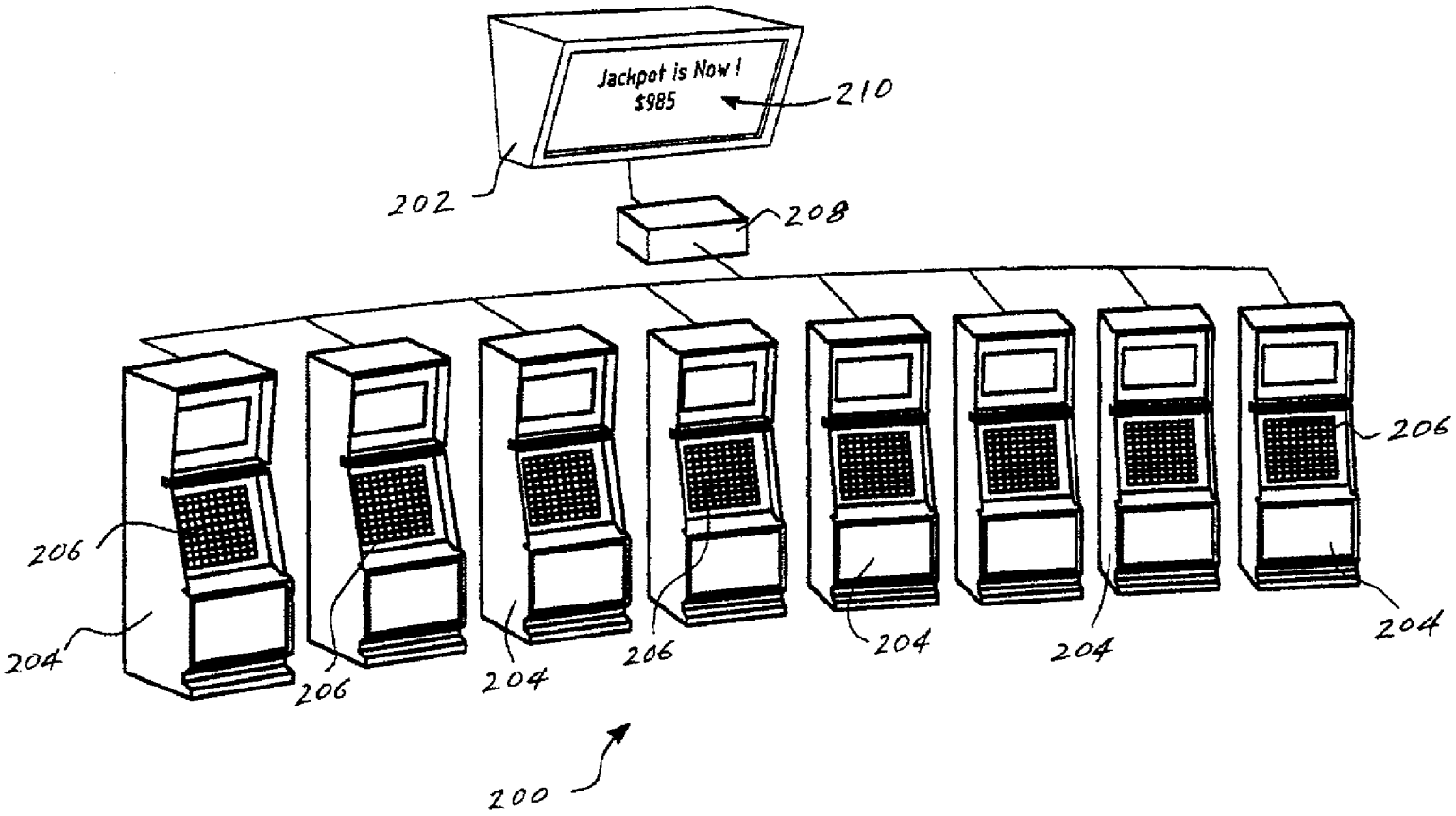
FIG. 6 is a perspective view of an array of gaming machines according to FIG. 1 or 4 linked to a progressive jackpot system.

In this embodiment the symbols 46 of the bonus feature will appear within the boundaries of the hexagonal elements 47 but so arranged as not to obscure the symbols 48 of the base game. This may be achieved as indicated in FIG. 6, by suitable sizing and placement of both the base game symbol and the bonus feature symbol.

Game Implementation

Figure 4:
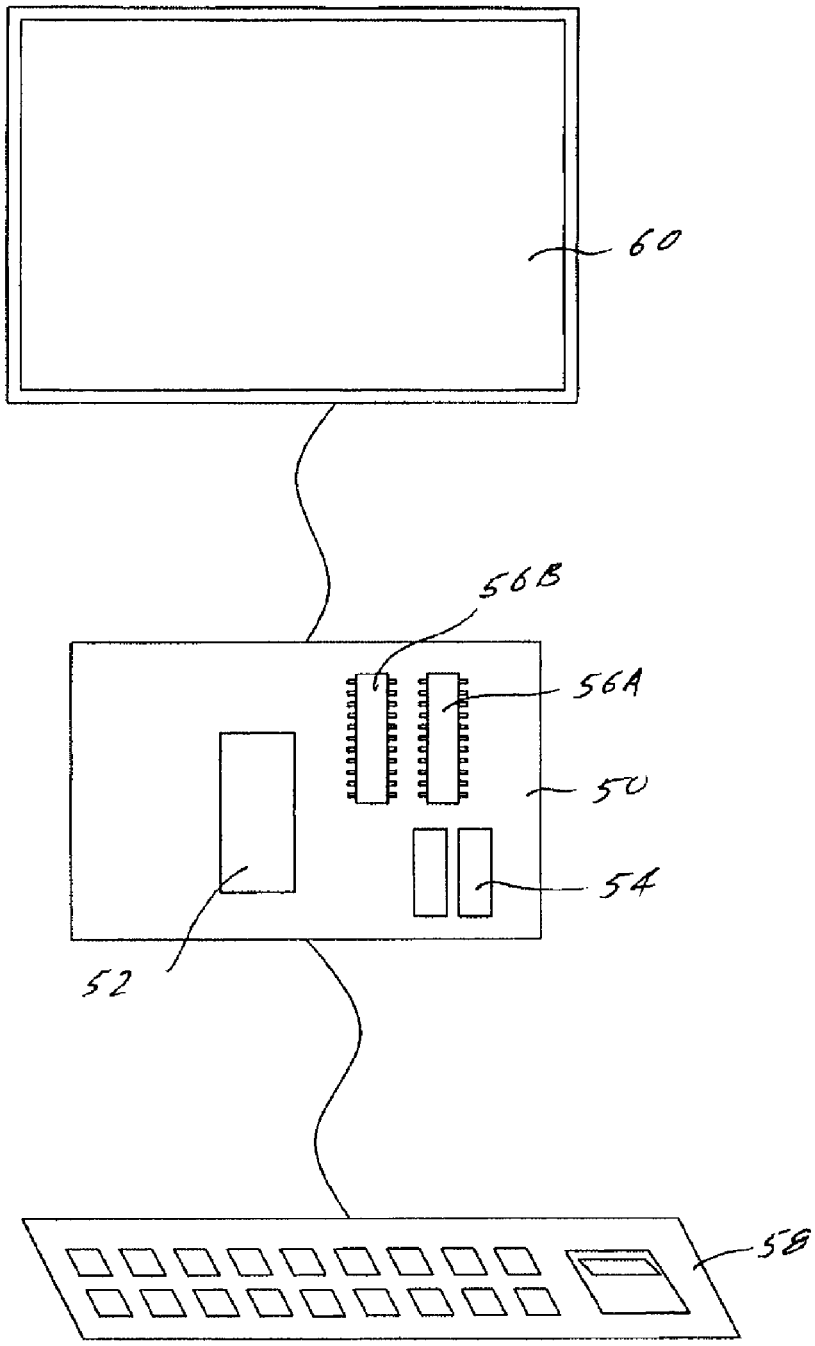
FIG. 4 is a schematic of a game machine control panel interacting with a control module and display module.

The base game and bonus feature may be implemented on any gaming machine or group of gaming machines provided with a control module for displaying graphic imagery on an electronic display module. As shown in FIG. 4, a control module 50 is provided with a microprocessor 52 and working random access memory (RAM) 54. The program codes driving firstly the base game and secondly the bonus feature and any awarded bonus feature games may be introduced into the control module 50 from separate data storage devices 56A and 56B. These devices may take any of a number of forms, such as read only memory (ROM), erasable read only memory (EPROM), Compact Flash Card, PCMCIA card and the like. Alternatively, control module 50 may incorporate a hard disc drive to which the code may be written via a suitable input device.

Control module 50 acts to implement appropriate elements of the program code according to inputs from a user keyboard 58 and outputs video imagery to at least a main display module 60.

Examples of Gaming Machine Implementation

1. Stand-Alone Gaming Machines

Any of the above described embodiments for use on electronic display gaming machines may be incorporated into a stand-alone gaming machine 10 provided with a single display unit 12 as shown in FIG. 1. In this implementation of games according to the invention, both the base game and bonus feature, as well as bonus feature games (if awarded) are displayed on the single display unit.

2. Stand-Alone Gaming Machines with Secondary Display Unit

Figure 5:
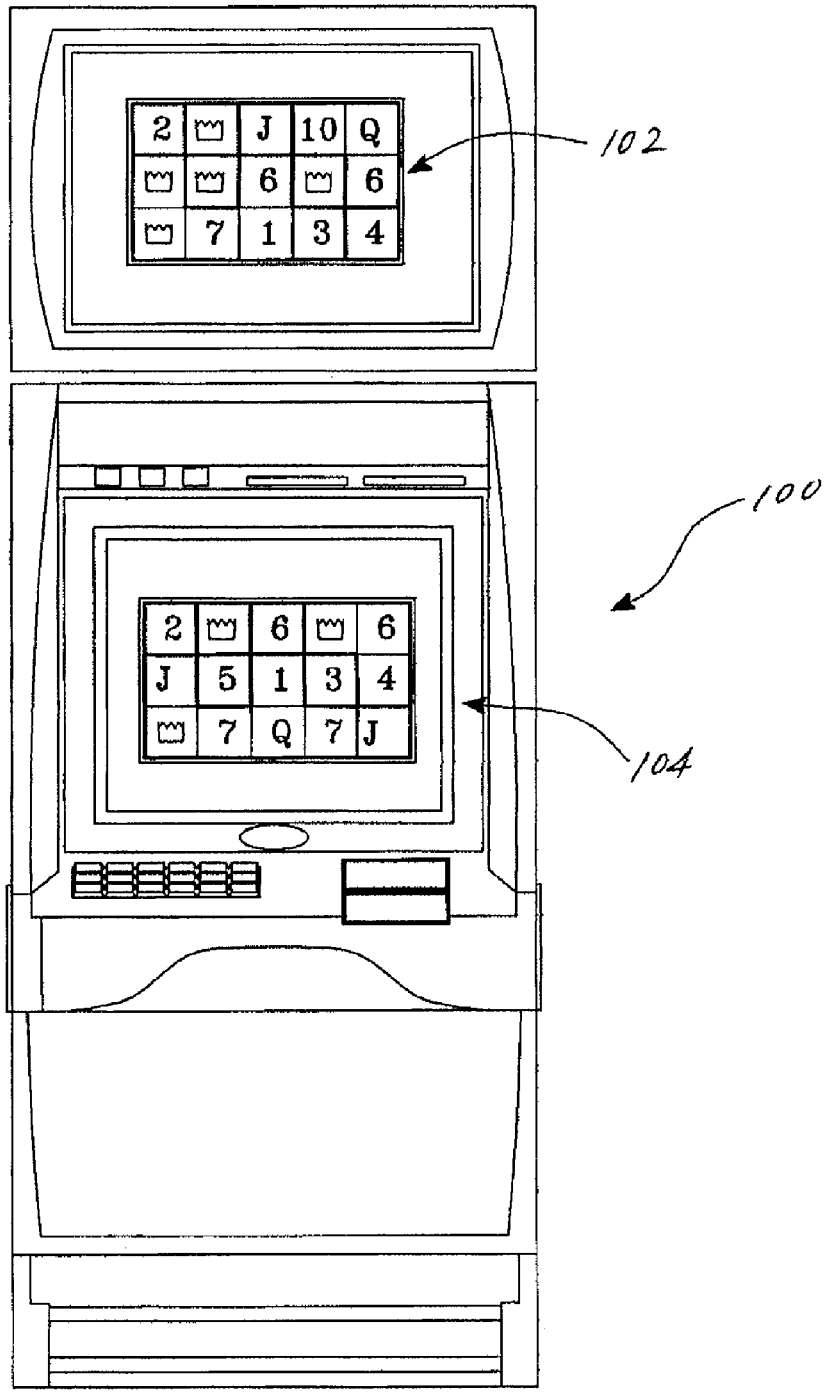
FIG. 5 is a front view of a gaming machine provided with primary and secondary displays.

In a further preferred embodiment of the invention as shown in FIG. 5, a stand-alone gaming machine 100 is provided with a secondary display unit 102 as well as a main display unit 104. In this embodiment the base game and bonus feature are played on the primary display unit.

Bonus feature games in this implementation may be played on the secondary display unit. Alternatively, the bonus feature game is played on the primary display, allowing the secondary display to be used for a progressive jackpot feature associated with the bonus feature game.

3. Gaming Machines Linked to Progressive Jackpot System

In yet a further preferred embodiment of the invention as shown in FIG. 6, a plurality of gaming machines 200 are arranged side by side in a line or arc so as to allow each of the players (not shown) of the machines to view a common jackpot prize display unit 202. Each individual machine 204 is provided with at least a main game display unit 206 for the playing of a base game and bonus feature, as well as any awarded bonus feature game as described above.

Each of machines 204 of the embodiment illustrated in FIG. 6 is electronically linked to a jackpot control module 208 which monitors the volume of play on each of the linked machines and displays an incrementing jackpot value 210 determined according to the combined volume of play on the linked machines.

A win of the jackpot prize may be triggered by specific outcomes of either a base game or of a bonus feature game. If the jackpot trigger is dependent on an outcome of the bonus feature game, players on adjoining machines may be made aware by means of the common display that a potential triggering of the jackpot is to commence on the machine offered the bonus feature game, thus adding interest for all the players.

It will be appreciated that the linked machines may form part of Local Area Networks (LAN) or Wide Area Networks (WAN).

The above describes only some embodiments of the present invention and modifications, obvious to those skilled in the art, can be made thereto without departing from the scope and spirit of the present invention.

What is claimed is:

1. A bonus feature for a gaming machine having a display window in which additional graphic features are displayed as overlays of [the] graphic imagery of the base game in the display window, said graphic imagery of said base game comprising symbols arranged in a first matrix of symbol containing elements wherein the elements in the base game are bounded by hexagonal figures *or quadrilateral figures* and are staggered to allow nesting of contiguous [hexagonal] elements and wherein the first matrix of symbol containing elements [are] *is* arranged into a plurality of parallel columns that [rotates] *rotate* as a plurality of simulated inner reels through the display window, wherein each column of symbols of the columns of said first matrix comprises at least [a] three symbol containing elements of the rotatable inner reel[, ]; said additional graphic features comprising symbols in selected elements of a second matrix of *symbol containing* elements wherein the second matrix of symbol containing elements [are] *is* arranged into a plurality of parallel columns that rotate as a plurality of simulated outer reels through the display window so as to overlie the one or more of the plurality of inner reels [wherein the plurality of simulated outer reels that are selected from a plurality of sets of simulated outer reels]; said set of simulated outer reels being selected from a plurality of sets of predetermined simulated outer reels, a random selection determining which set of said plurality of sets of pre-determined simulated outer reels is used for [said] *a* bonus feature for each play of said base game and wherein a predetermined arrangement of said additional graphic feature [trigger] *triggers* at least one *said* bonus feature game and wherein the set of simulated inner reels rotate at a first rotational speed during play of the game and wherein the set of simulated outer reels rotate at a second rotational speed during play of the game so that elements of one or more of the plurality of sets of outer reels may be in registration with elements of one or more of the plurality of inner sets of reels when the elements are rotating through the window wherein when the elements are in registration, the registered elements of the outer and inner reel rotate through the display window at the same speed so as to maintain the registration therebetween while visible [during] *in* the display window.

2. The bonus feature of claim 1 wherein said symbols of said bonus feature are positioned in said elements of said second matrix so as not to obscure said symbols in said elements of said first matrix.

3. The bonus feature of claim 1 wherein said bonus feature and said base game are logically distinct; neither one influencing an outcome of the other.

4. The bonus feature of claim 1 wherein sequences of said additional graphic features on each reel of said set of outer reels are predetermined.

5. The bonus feature of claim 1 wherein each set of said plurality of sets of predetermined outer reels confers a different probability of triggering said at least one bonus game.

6. The bonus feature of claim 1 wherein value of a bet on said base game determines a weighting applied to said random selection of said set of said outer reels.

7. The bonus feature of claim 1 wherein selection of a line bet on said base game determines a weighting applied to said random selection of said set of said outer reels.

8. The bonus feature of claim 1 wherein selection of a combination of value of a bet and selection of a pay line determines a weighting applied to said random selection of said set of said outer reels.

9. The bonus feature of claim 1 wherein probability of triggering said at least one bonus game is greater than zero for any selection of said set of outer reels.

10. The bonus feature of claim 1 wherein a bonus feature game conferred by a predetermined displayed outcome of said bonus feature is played on a primary display screen of said gaming machine.

11. The bonus feature of claim 1 wherein a bonus feature game conferred by a predetermined displayed outcome of said outer reels is played on a secondary display screen of said gaming machine.

12. The bonus feature of claim 1 wherein said bonus feature game is played on a primary display of said gaming machine; a secondary display of said machine displaying a progressive jackpot feature associated with said bonus feature game.

13. The bonus feature of claim 1 wherein said base game and said bonus feature game are played on a number of gaming machines linked to a progressive jackpot controller.

14. The bonus feature of claim 1 wherein said n-sided figures of adjoining said inner reels of said base game are aligned in rows.

15. The bonus feature of claim 1 wherein symbols of said bonus feature game are arranged for display when said inner and said outer reels are at rest, within said n-sided figures.

16. The bonus feature of claim 14 wherein symbols of said bonus feature are arranged for display when said inner and said outer reels are at rest, adjoining to but outside of said n-sided figure of said base game.

* * * * *